Jan. 3, 1956   J. R. C. QUILTER   2,729,408
PARACHUTE APPARATUS FOR RETARDING AIRCRAFT
Filed April 20, 1953   4 Sheets-Sheet 1
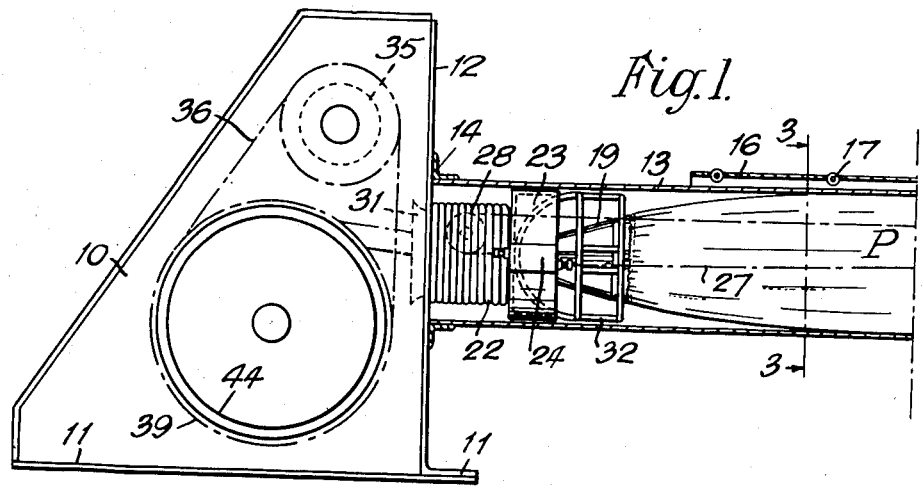
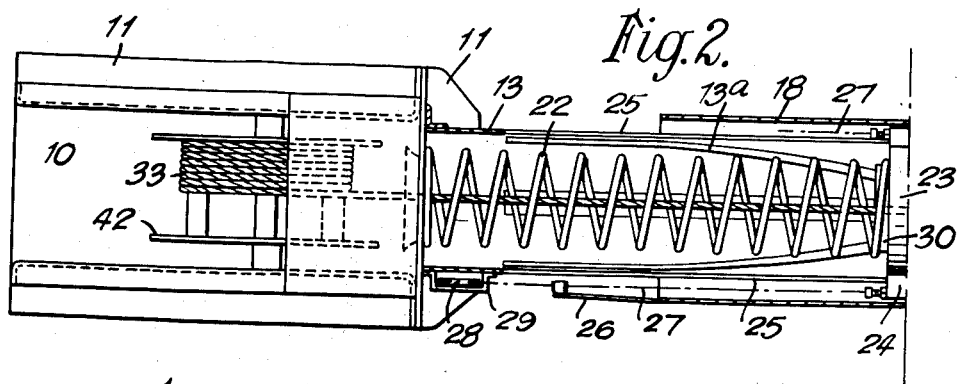
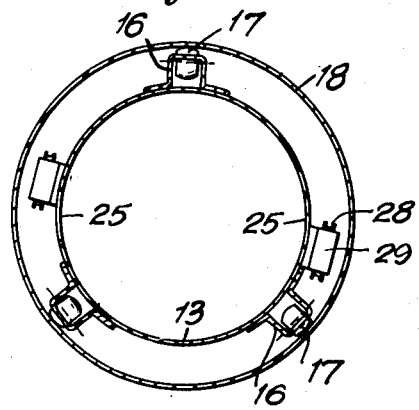
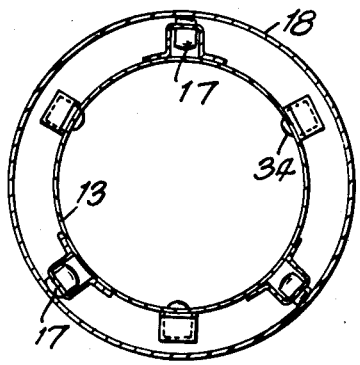
INVENTOR
John R. C. Quilter
By Shoemaker + Mattare
ATTORNEYS Jan. 3, 1956  J. R. C. QUILTER  2,729,408
PARACHUTE APPARATUS FOR RETARDING AIRCRAFT
Filed April 20, 1953  4 Sheets-Sheet 2
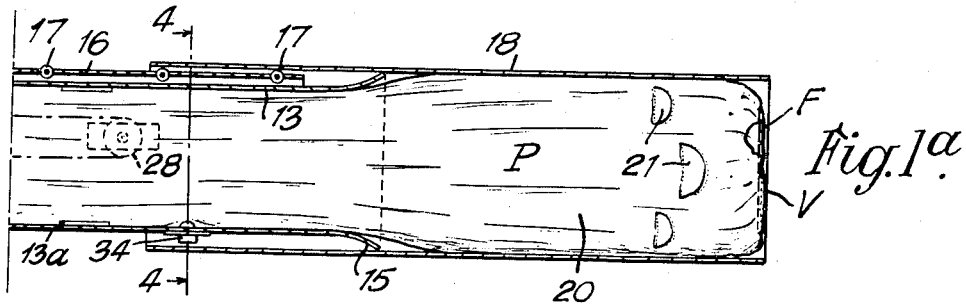
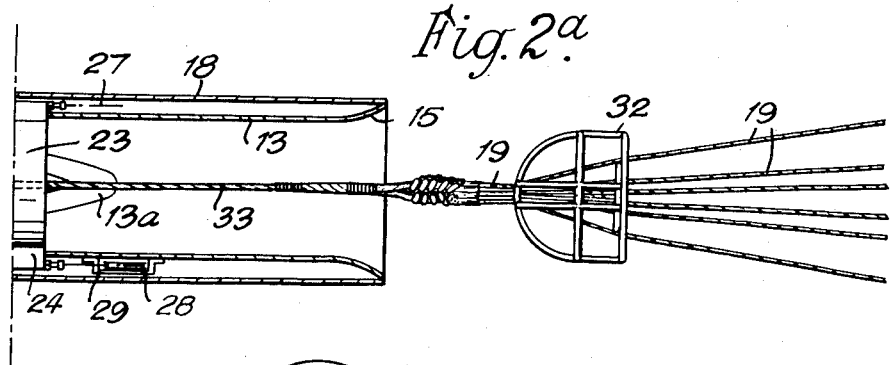
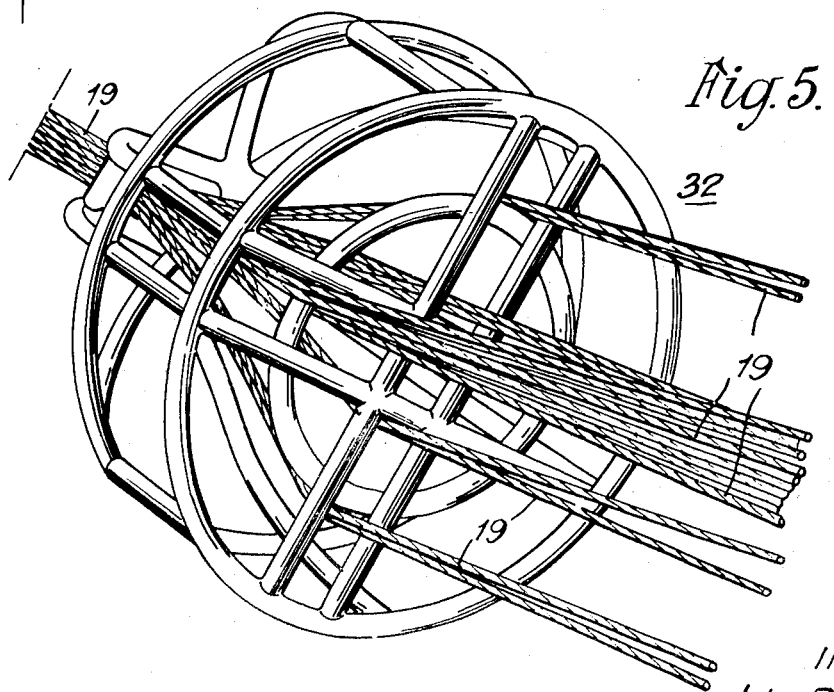
INVENTOR
John R.C. Quilter
By Shoemaker + Mattare
ATTORNEYS Jan. 3, 1956 J. R. C. QUILTER 2,729,408
PARACHUTE APPARATUS FOR RETARDING AIRCRAFT
Filed April 20, 1953 4 Sheets-Sheet 3

INVENTOR
John R.C.Quilter
By Shoemaker & Mattare
ATTORNEYS

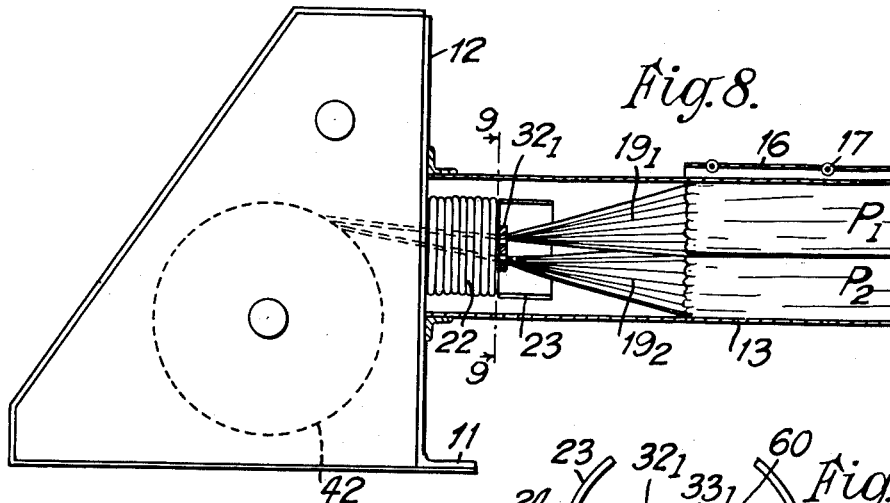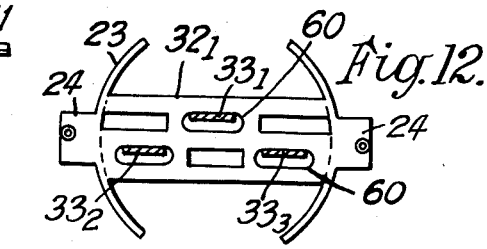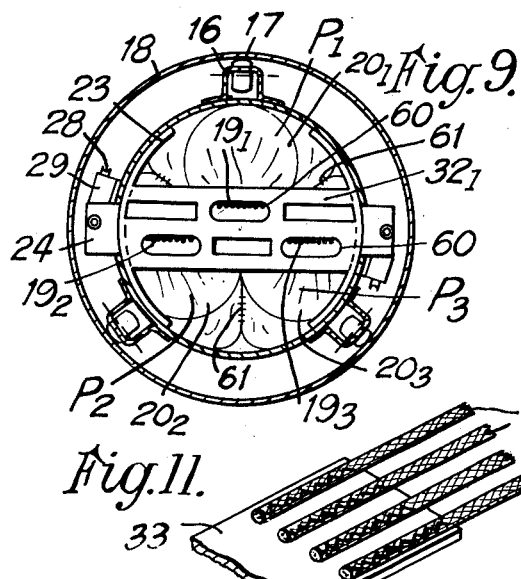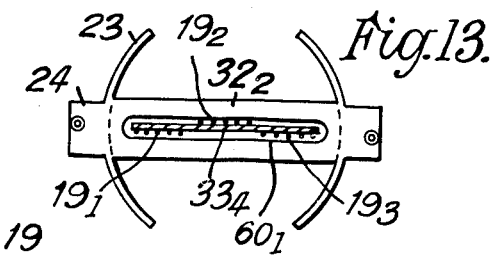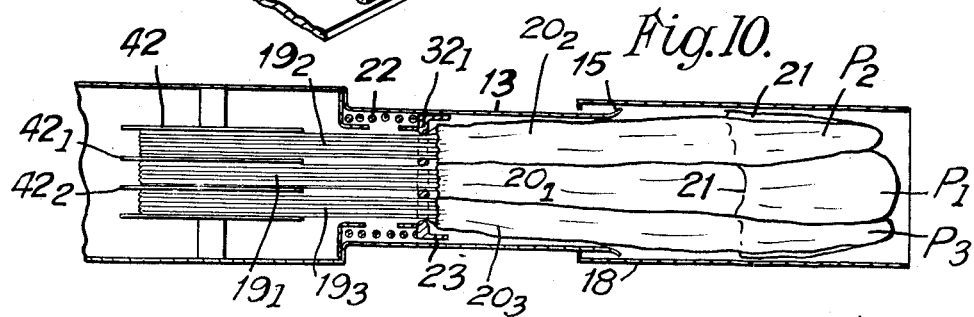

United States Patent Office 2,729,408
Patented Jan. 3, 1956

2,729,408
PARACHUTE APPARATUS FOR RETARDING AIRCRAFT

John Raymond Cuthbert Quilter, Woking, England

Application April 20, 1953, Serial No. 349,717

Claims priority, application Great Britain April 23, 1952

10 Claims. (Cl. 244—113)

This invention relates to parachute apparatus for retarding aircraft, particularly before landing.

With known apparatus of this kind, it is customary to cast off the parachute after the aircraft has touched down on the runway, further deceleration of the craft being left to its wing flaps and brakes; consequently the discarded parachute may be caught by the wind and carried for a considerable distance before coming to rest, its canopy and rigging being therefore liable to interfere with other aircraft in the vicinity. This drawback is particularly serious in cases where a number of aircraft may be landing at short intervals one after another.

The present invention has for its main object to provide improved parachute apparatus for retarding aircraft, in which the parachute can be recovered and rehoused in the aircraft after use and even before the aircraft has come to rest, so that the parachute is not only prevented from becoming an obstacle to other craft but is also saved from damage by contact with the ground while the aircraft is completing its stop; moreover, the recovery and rehousing of the parachute may be effected while the aircraft is in flight, so that the speed of the aircraft can be quickly reduced, even if there is no intention to land, for example as a maneuver in aerial combat or in an avoiding action.

Another object of the invention is to ensure the orderly release of the parachute canopy and rigging lines so as to avoid the risk of fouling at the critical moment of release.

A further object is to facilitate the return of the parachute and its rigging lines to normal position in their housing ready for a subsequent release, thereby reducing the number of operations to be performed on the ground, as compared with the customary practice of casting off the retarding parachute and refitting.

Other objects and advantages of the invention will hereinafter appear from the following description of suitable embodiments, given with reference to the accompanying drawings, in which:

Figs. 1 and 1a together represent a part-sectional elevation of the improved parachute apparatus in one embodiment of the invention, the apparatus being shown in its normal position ready for use;

Figs. 2 and 2a together represent a part-sectional plan thereof, the parachute canopy having been released from its housing and the rigging lines and cable connected thereto partly withdrawn;

Figs. 3 and 4 are cross-sections on a larger scale, taken on the line 3—3 of Fig. 1 and line 4—4 of Fig. 1a respectively;

Fig. 5 is a perspective view of a separator provided for the rigging lines;

Fig. 8 is a part-sectional elevation corresponding to Fig. 1, illustrating another embodiment employing a plurality of parachutes, the apparatus being in its normal position ready for use;

Fig. 9 is a cross-section on a larger scale, taken on the line 9—9 of Fig. 8, looking towards the right of that figure;

Fig. 10 is a simplified plan showing the rigging lines partly wound upon a winch;

Fig. 11 is a detail perspective view showing parachute rigging lines attached to a tensile member;

Fig. 12 shows a separator engaged by three tensile members attached to the rigging lines;

Fig. 13 shows a modification of Fig. 12, in which a single tensile member is attached to the rigging lines of a plurality of parachutes.

Figure 6:
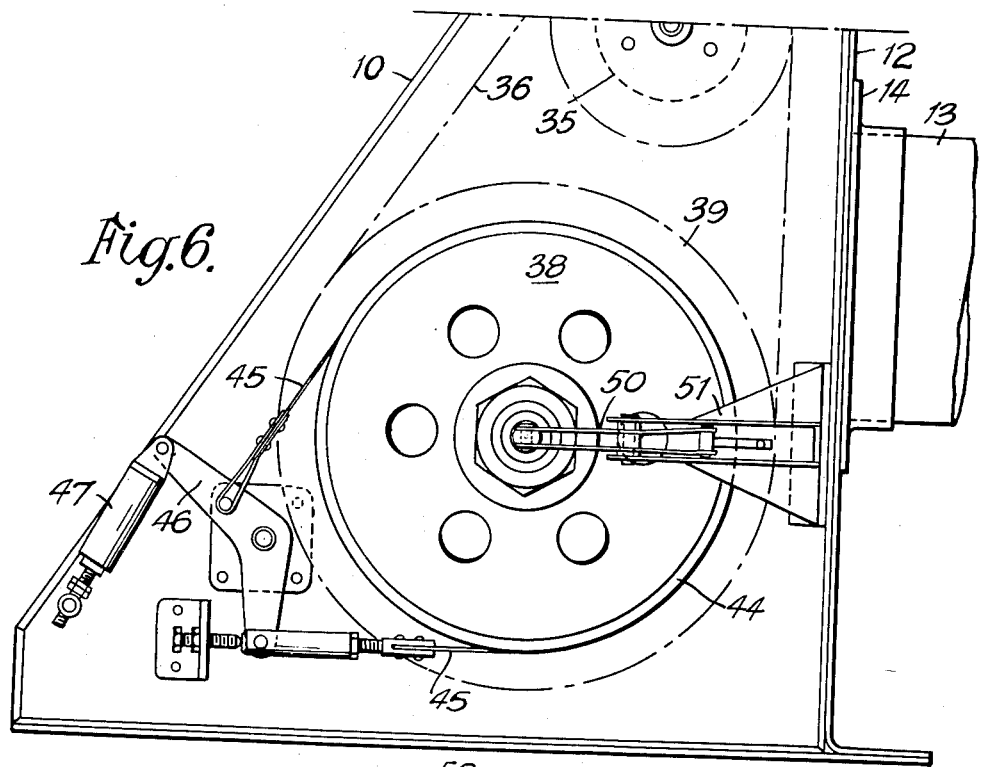
Fig. 6 is an elevation on a larger scale of the mechanism for controlling the cable and rigging lines of the parachute.

Referring to Figs. 1 and 2, the apparatus illustrated comprises a box-form structure 10, fabricated from sheet metal, having feet or flanges 11 by which it can be secured in position upon the aircraft, with its end-wall 12 towards the rear of the aircraft. From this wall there projects a tubular member 13, secured by means of an angle-section ring 14, and having its rear end expanded to form a bell-mouth 15, as seen in Figs. 1a and 2a. This member 13 is fitted externally with three longitudinal rails 16, disposed at angles of 120° apart as seen in Fig. 3, each rail supporting a number of rollers 17 over which there can slide an outer tubular member 18 of larger diameter than the inner member 13, this outer member being an easy sliding fit over the bell-mouth 15. The two members 13 and 18 form inner and outer parts of a telescopic housing for the retarding parachute P, which is stowed therein by being pulled out axially to its full extent, the rigging lines 19 being passed into the inner part or member 13 and the dome-portion 20 of the canopy then loosely packed into the outer part or member 18. As seen in Fig. 1a, the dome-portion is formed with a number of pockets or flutes 21 having their open ends directed towards the circumference of the canopy, so that in the stowed position shown, these pockets present their open ends towards the bell-mouth 15.

The outer part or member 18 can be slid back over the inner part or member 13 so that the dome-portion 20 of the canopy will be left exposed to the air-stream, the air then filling the pockets 21 and exerting an outward pull tending to draw the parachute out of its housing. This movement of the outer member 18 is produced by a coiled spring 22 fitted between the end-wall 12 and a piston 23 movable freely within the tubular inner member 13, the piston having two diametrically opposite lugs 24 extending through slots 25 in the walls of the member 13, as seen in Fig. 2; the outer member 18 has two diametrically opposite fingers 26, of which one is seen in Fig. 2, set at about 12° from the lugs 24. These lugs and the fingers 26 engage with opposite runs of flexible steel wires 27 passing over guide pulleys 28 supported in blocks 29 upon the exterior of the stationary inner member 13, so that as the piston 23 moves away from the wall 12, it causes the wires 27 to pull the outer member 18 back towards the wall, until reaching the position shown in Figs. 2 and 2a.

The piston 23 has a central aperture the edge of which is turned out as a spigot 30 for centering the spring 22 at this end; the other end of the spring is similarly engaged by a spigot-mouth 31 secured in the wall 12. The rigging lines 19 from the periphery of the parachute canopy extend through the spigot 30, through the open center of the spring 22, and through the spigot-mouth 31, but between the piston 23 and the periphery of the parachute these lines 19 are threaded through a separator 32 in the form of a cage (see Fig. 5) having a domed center and transverse ribs, serving to keep the rigging lines from becoming entangled. When the parachute is drawn out of its housing, the rigging lines 19 can slide easily through the slots or apertures between the ribs of the separator cage 32, the latter traveling slowly towards the bell-mouth 15 until the rigging lines have passed substantially through the cage, whereupon the latter is forced out of the housing by the bunched ends of the lines 19, which are attached to a cable 33, as seen in Fig. 2a.

On the return movement, the separator 32 will be carried along by the rigging lines 19, until it encounters the bell-mouth 15, its domed center then guiding it smoothly into position inside the member 13 of the housing; the lines 19 continue their movement, sliding freely through the slots or apertures of the separator 32, until the parachute canopy is drawn against the transverse ribs of the latter, whereupon the separator will be forced back to its normal position, as seen in Fig. 1. The travel of the separator may be controlled frictionally by spring blades 13a on the inner face of the tubular member 13.

Upon the wall of the inner member 13 of the housing, there are fitted three angularly spaced ball catches 34, with spring-pressed balls projecting inwardly through the wall so as to engage with the separator 32 and to assist in retaining the parachute in the housing.

The cable 33 is normally wound upon a winch located inside the structure 10, the rigging lines attached to the outer end of the cable being partly wound over it in the normal position; re-winding of the cable and rigging lines can be effected for the return movement of the parachute by means of an electric, hydraulic or other motor 35, operating the winch through a chain 36.

Figure 7:
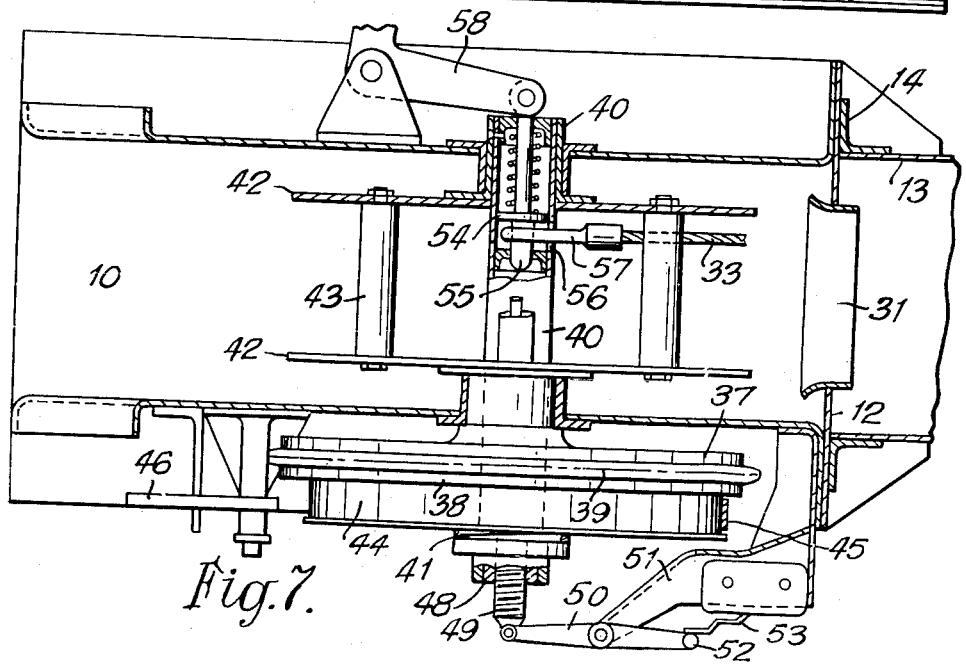
Fig. 7 is a plan view of Fig. 6.

As shown more clearly in Figs. 6 and 7, the winch is provided with a friction clutch formed by two plates 37, 38, between which the driven chain sprocket 39 is mounted, the plate 37 being fixed to the shaft 40 of the winch, and the plate 38 being slidably keyed to the same shaft and pressed along it by means of a spring 41 so that the sprocket is normally clutched to the shaft. Upon the shaft 40 there are also secured two cheek plates 42 having four tubular spacers 43 bolted between them, this assembly forming the winch. The plate 38 has a lateral flange forming a drum 44, which is engaged by a brake band 45 controlled by a bell-crank lever 46 pivotally mounted upon one side of the structure 10; the bell-crank is connected to a spring buffer 47, which normally keeps the band 45 tight upon the drum 44. Any other convenient form of brake may be used.

Inside this end of the hollow shaft 40, there is fixed a nut 48 engaged by a screw 49, the outer end of which is pivotally attached to one extremity of a rocking lever 50 pivoted upon a bracket 51 secured to the structure 10; the lever 50 carries at its other extremity a roller 52 adapted to engage with a contact 53, thereby completing the circuit of the motor 35, but when the screw 49 reaches the inner end of its travel, after the cable 33 and rigging lines 19 have been almost fully rewound upon the winch, the roller 52 will lift from the contact 53, thereby breaking the motor circuit.

At the other end of the shaft 40, a plunger 54 is slidable inside the bore of the shaft, this plunger having a pin 55 which normally lies in line with a slot 56 in the wall of the hollow shaft; the pin 55 serves for anchoring a loop 57 at the end of the cable 33 so as to secure the latter to the winch, the cable being threaded between two of the spacers 43 and its looped end engaged upon the pin. By means of a bell-crank lever 58 pivotally mounted upon the side of the structure 10, the pin 55 can be withdrawn from the loop 57, thereby freeing the cable from the winch.

In assembling the parts, the cable 33 will be unwound from the winch, approximately to the position shown in Figs. 2 and 2a, the band brake being then applied lightly to hold the winch stationary; the rigging lines 19 of the parachute will be threaded through the cage 32, preferably with not more than two lines in each slot or aperture of the cage, and their ends secured together by means of a thimble or the like at the outer end of the cable. The parachute P may be for example about five feet in diameter when deployed, depending upon the size and speed of the aircraft, with an axial vent V and a ring-frame F surrounding the vent, the diameter of this frame being about six inches so that it will fit inside the outer member 18 of the housing; the parachute canopy can be held by means of this frame while the motor 35 is set in motion so as to wind up the cable 33 upon the winch, to which its looped extremity has already been fastened as above described. When the cage 32 enters the bell-mouth 15, being guided into place by its domed center, the rigging lines 19 will be drawn through it and wound upon the winch, over the coils of the cable 33 or beside these coils, if desired; any convenient means may be provided for traversing the coils and lines along the winch as the winding proceeds. Due to the bell-mouth 15, the rigging lines will cause the parachute to contract in diameter, while assuming a somewhat conical shape which gradually becomes smaller until it can enter the inner member 13 of the housing.

After the rigging lines have been wound up for nearly the whole of their length, the parachute canopy will carry the cage 32 into the interior of the housing until the domed end of the cage abuts against the inside of the piston 23; the tension transmitted by the rigging lines will then cause the piston to slide inwards of the housing, back to the position shown in Fig. 1. By the action of the wires 27 connecting the piston to the outer member 18 of the housing, the latter will be made to slide out over the inner member 13 and the projecting dome-portion of the canopy, being guided by the rollers 17, until it reaches the normal position shown in Fig. 1a; at the same time, the spring 22 will be compressed, as seen in Fig. 1. As the rewinding of the cable and rigging lines approaches completion, the lever 50 will automatically switch off the motor by movement of the rocking lever 50, the winch being held fast by the band-brake.

In order to reduce speed before landing or at any other time, the pilot of the aircraft will free the clutch and brake devices controlling the winch; thereupon the spring 22 will start to force back the piston 23 and draw the outer member 18 of the housing clear of the parachute canopy. The pocket-fitted dome portion 20 is thus exposed to the air stream, the action of which will pull the parachute and its rigging lines out of the housing, followed by the cable 33, which will remain attached to the pin 55 inside the shaft 40 of the winch by means of its looped end. The tension of this cable, transmitting the pull of the parachute, will slow down the aircraft within a relatively short time, for example from a flying speed of several hundred miles per hour to about one hundred miles per hour; as this reduced speed is reached, the pilot will switch on the motor 35 after re-engaging the clutch device. The motor will begin by winding in the cable 33, until the latter draws in the rigging lines 19 through the slots or apertures of the cage 32, which eventually brings the cage into abutment with the piston 23; thereupon the piston will be made to compress the spring 22 and to extend the outer member 18 of the housing over the collapsed parachute, as explained above, all the parts then being in the original position of Figs. 1 and 1a, ready for another retarding operation.

If the pilot decides that the retarding parachute P must be cast off for any reason, he has only to operate the bell-crank 58 in order to withdraw the pin 55 from the looped extremity of the cable inside the winch; this will allow the parachute to carry away the rigging lines and the cable, leaving the mechanism of the apparatus intact upon the aircraft. The jettisoned parachute, rigging lines and cable can be subsequently recovered from the ground and refitted, or another set may be installed upon the existing mechanism.

In many cases, particularly for large aircraft, it will be desirable to provide a plurality of retarding parachutes, for example three or four, each of approximately half the diameter of a single one affording an equal retarding force; one advantage of the use of several smaller parachutes is that the rigging lines of the smaller parachutes will be proportionally shorter and they can therefore be more conveniently stowed and/or wound upon the winch.

As shown in Figs. 8 and 9, there are three parachutes $P_1$, $P_2$ and $P_3$ with sets of rigging lines $19_1$, $19_2$ and $19_3$, stowed side by side within the inner member 13 of the telescopic housing, the dome-portions of the canopies extending into an outer member slidable oppositely to the piston 23, as in the case of Figs. 1a and 2a. The respective sets of rigging lines are attached to tensile members $33_1$, $33_2$ and $33_3$, which are normally wound upon a winch comprising two cheek-plates 42 and intermediate plates $42_1$ and $42_2$ for keeping the tensile members apart, as seen in Fig. 10. These members may consist of wire cables, like the cable 33 shown in Figs. 2, 2a and 7, or of flat webs or strops as shown in Figs. 11, 12 and 13, the rigging lines being attached to the strops for example by stitching, as indicated in Fig. 11; the rigging lines are partly wound over the strops upon the winch in the normal retracted position, as seen in Fig. 10.

A separator $32_1$ may be secured between the coiled spring 22 and the piston 23, to assist in guiding the tensile members $33_1$, $33_2$ and $33_3$ and rigging lines $19_1$, $19_2$ and $19_3$ as they unwind from the winch for releasing the parachutes, and again as they are rewound upon the winch when retracting the parachutes. This separator is shown in Fig. 12 as having three slots 60, each guiding one of the tensile members and its attached rigging lines, the slots being conveniently staggered at two different levels for the connections to the parachute $P_1$ in the upper part of the telescopic housing and for the two sets of connections to the parachutes $P_2$ and $P_3$ in the lower part of the housing. Fig. 9 also shows the three parachute canopies $20_1$, $20_2$ and $20_3$ connected together peripherally by ties 61, so that when deployed the three parachutes will form a linked cluster, thus obviating the risk of damage by swaying movement, rubbing or impact; these ties may, however, be dispensed with, if so desired.

In a modification, the several parachutes may have their rigging lines all connected to a single tensile member or strop of suitable width, sufficient for attachment of all the rigging lines, the separator $32_2$ being formed with a single slot $60_1$ of corresponding width, as shown in Fig. 13, for passage of the strop $33_4$.

The cage or separator 32 shown in Figs. 1, 2a and 5 may be used for controlling the rigging lines beyond the piston 23, in conjunction with a separator such as shown in Figs. 8 and 9, or in Fig. 12 or 13 for controlling the tensile member or members to which the rigging lines are attached, particularly when the tensile members take the form of flat webs or strops.

Inasmuch as the release of the parachute or parachutes is brought about mainly by exposure to the air-stream, the desired result may be attained either by forcing the canopy or canopies out of the housing for example by the action of a spring as above described, or by withdrawing the part of the housing which normally encloses the canopy or canopies, for example by sliding back the outer member of a telescopic housing as above described, or by the combination of both movements, for example by transmitting the spring action to the outer member by flexible steel wires, as described.

It will be understood that the number of parachutes employed may be varied to suit requirements, depending upon the size and speed of the aircraft, and that the number of tensile members or strops may also be varied, for example by providing two such members each attached to two sets of rigging lines in the event of four parachutes being employed.

What I claim is:

1. Parachute apparatus for retarding aircraft in flight, comprising a parachute with rigging lines connected to the aircraft, a housing upon the aircraft, said housing including telescopic parts slidable in relation to one another, said parachute and rigging lines being normally enclosed within said housing while said telescopic parts are extended in relation to one another, means for exposing said parachute to the air-stream by relative movement of said telescopic parts, said parachute operating when deployed in the air-stream to draw said rigging lines out of said housing, and means for retracting said rigging lines and parachute into said housing after deployment, said retracting means operating to extend said telescopic parts for normal enclosure of said rigging lines and parachute.

2. Parachute apparatus for retarding aircraft in flight, comprising a parachute with a dome-portion and a skirt-portion having rigging lines connected to the aircraft, a housing upon the aircraft, said housing including inner and outer parts telescopically slidable in relation to one another, said inner part being secured to the aircraft and said outer part normally extending therefrom, said parachute and rigging lines being normally enclosed within said housing with said dome-portion occupying said outer part and said skirt-portion and rigging lines occupying said inner part, means for exposing said dome-portion to the air-stream by sliding movement of said outer part towards said inner part, said dome-portion when exposed operating to draw said skirt-portion and said rigging lines out of said inner part, and means for retracting said rigging lines and parachute into said housing after deployment, said retracting means operating to extend said outer part relatively to said inner part for normal enclosure of said dome-portion.

3. Parachute apparatus for retarding aircraft in flight, comprising a parachute with a dome-portion including external pockets and a skirt-portion having rigging lines connected to the aircraft, a housing upon the aircraft, said housing including inner and outer parts telescopically slidable in relation to one another, said inner part being secured to the aircraft and said outer part normally extending therefrom, said parachute and rigging lines being normally enclosed within said housing with said dome-portion occupying said outer part and said skirt-portion and rigging lines occupying said inner part, means for exposing said dome-portion to the air-stream by sliding movement of said outer part towards said inner part, said pockets when exposed to the air-stream causing said dome-portion to draw said skirt-portion and said rigging lines out of said inner part, and means for retracting said rigging lines and parachute into said housing after deployment, said retracting means operating to extend said outer part relatively to said inner part for normal enclosure of said dome-portion.

4. Parachute apparatus for retarding aircraft in flight, comprising a parachute with rigging lines connected to the aircraft, a housing upon the aircraft, said housing including inner and outer parts telescopically slidable in relation to one another, said inner part being secured to the aircraft and said outer part normally extending therefrom, said parachute and rigging lines being normally enclosed within said housing, means for exposing said parachute to the air-stream by forcing it out of said housing and sliding said outer part towards said inner part, said parachute operating when deployed to draw said rigging lines out of said housing, and means for retracting said rigging lines and parachute into said housing after deployment.

5. Parachute apparatus for retarding aircraft in flight, comprising a parachute with rigging lines connected to the aircraft, a housing upon the aircraft, said housing including inner and outer parts telescopically slidable in relation to one another, said inner part being secured to the aircraft and said outer part normally extending therefrom, said parachute and rigging lines being normally enclosed within said housing while said outer part is extended in relation to said inner part, a slidable member fitted within said inner part, said slidable member being apertured for guiding passage of said rigging lines therethrough, spring means for forcing said slidable member to impart an outward movement to said rigging lines and parachute, means for sliding said outer part towards said inner part so as to expose said parachute to the air-stream, said parachute operating when deployed in the air-stream to complete the outward movement of said rigging lines, and means for retracting said rigging lines and parachute into said housing after deployment, said retracting means operating to draw said rigging lines back through said apertured slidable member and thereafter to return said slidable member and to load said spring means.

6. Parachute apparatus for retarding aircraft in flight, comprising a parachute with rigging lines connected to the aircraft, a housing upon the aircraft, said housing including inner and outer parts of tubular form, telescopically slidable in relation to one another with an annular space between them, said inner part being secured to the aircraft and said outer part normally extending therefrom, means for guiding said outer part in its sliding movement, said guiding means including rails extending along generatrices of one of said parts and rollers supported at intervals along the rails, said rollers having rolling contact with the other of said parts, said rails and rollers being accommodated within the annular space between said parts, said parachute and rigging lines being normally enclosed within said housing, means for exposing said parachute to the air-stream by sliding movement of said outer part towards said inner part, said parachute operating when deployed in the air-stream to draw said rigging lines out of said housing, and means for retracting said rigging lines and parachute into said housing after deployment, said retracting means operating to extend said outer part relatively to said inner part for normal enclosure of said parachute.

7. Parachute apparatus for retarding a vehicle, comprising a parachute with rigging lines connected to the vehicle, a housing upon the vehicle, said housing comprising concentric inner and outer tubular parts telescopically slidable in relation to one another, said inner part being secured to said vehicle and said outer part being normally extended therefrom, said parachute and rigging lines being normally enclosed within the extended housing, means for expelling said parachute from said housing and simultaneously causing said outer part to slide in relation to said inner part for contracting the housing telescopically, and means for retracting said parachute and rigging lines back into said housing after expulsion therefrom, said retracting means operative to return said housing to its normal extended condition.

8. Parachute apparatus for retarding a vehicle, comprising a parachute with rigging lines connected to the vehicle, a housing upon said vehicle, said housing comprising concentric inner and outer tubular parts telescopically slidable in relation to one another, said inner part being secured to said vehicle and said outer part being normally extended therefrom, said parachute and rigging lines being normally enclosed within the extended housing, means for expelling said parachute from said housing and simultaneously causing said outer part to slide in relation to said inner part for contracting the housing telescopically, a separator enclosed in said housing, said separator being apertured for passage of said rigging lines therethrough and having its apertures spaced for guiding said rigging lines to prevent entanglement thereof, and means for retracting said parachute and rigging lines back into said housing after expulsion therefrom, said retracting means operative to return said housing to its normal extended condition.

9. Parachute apparatus for retarding a vehicle, comprising a parachute with rigging lines connected to the vehicle, a housing upon said vehicle, said housing comprising concentric inner and outer tubular parts telescopically slidable in relation to one another, said inner part being secured to said vehicle and said outer part being normally extended therefrom, said parachute and rigging lines being normally enclosed within the extended housing, a piston slidable within said inner part, spring means for displacing said piston to expel said parachute from said housing, means for holding said spring means inoperative, means connecting said piston to said outer part for contracting said housing telescopically during expulsion of said parachute by said piston and spring means, and means for retracting said expelled parachute and rigging lines back into said housing, said piston and connecting means being arranged to return said spring means to initial position during retraction of said parachute and rigging lines and simultaneously to return said housing to its normal extended condition.

10. Parachute apparatus for retarding a vehicle, comprising a parachute with rigging lines secured to the vehicle, a housing for said parachute and rigging lines upon said vehicle, said housing comprising concentric inner and outer tubular parts telescopically slidable with respect to one another, said inner part being secured to said vehicle, said outer part being open towards the rear of said vehicle, means for expelling said parachute and rigging lines from said housing through the opening of said outer part, means for sliding said outer part forward in relation to said inner part by the operation of said expelling means, and means for retracting said parachute and rigging lines into said housing and simultaneously sliding said outer part rearward in relation to said inner part.

References Cited in the file of this patent

UNITED STATES PATENTS

| 1,024,676 | Burford | Apr. 30, 1912 |
| 1,644,251 | Hawes | Oct. 4, 1927 |
| 1,972,967 | Zahodiakin | Sept. 11, 1934 |
| 2,137,672 | Keough | Nov. 22, 1938 |
| 2,511,601 | Smith | June 13, 1950 |
| 2,513,967 | Heffernan | July 4, 1950 |
| 2,525,844 | Weaver | Oct. 17, 1950 |
| 2,611,565 | Quilter | Sept. 23, 1952 |

FOREIGN PATENTS

| 564,415 | Great Britain | Sept. 27, 1944 |
| 815,858 | France | July 24, 1937 |